United States Patent [19]
Shimizu et al.

[11] Patent Number: 6,097,460
[45] Date of Patent: *Aug. 1, 2000

[54] PHASE RETARDER FILM CONTAINING TIO$_2$

[75] Inventors: Akiko Shimizu; Koji Higashi, both of Ibaraki; Takahiro Hishinuma, Toyonaka, all of Japan

[73] Assignee: Sumitomo Chemical Company, Limited, Osaka, Japan

[ * ] Notice: This patent is subject to a terminal disclaimer.

[21] Appl. No.: 09/233,962

[22] Filed: Jan. 20, 1999

[30] Foreign Application Priority Data

Jan. 21, 1998 [JP] Japan .................................. 10-009543

[51] Int. Cl.$^7$ ............................ G02F 1/1335; G02B 5/30
[52] U.S. Cl. ......................... 349/117; 349/118; 359/486; 359/492
[58] Field of Search .................................. 349/117, 118; 359/486, 492, 494

[56] References Cited

U.S. PATENT DOCUMENTS

| | | | |
|---|---|---|---|
| 4,657,350 | 4/1987 | Mori | 350/401 |
| 4,813,768 | 3/1989 | Hamaguchi et al. | 350/347 |
| 5,430,566 | 7/1995 | Sakaya et al. | 359/73 |
| 5,504,603 | 4/1996 | Winker et al. | 359/73 |
| 5,557,434 | 9/1996 | Winker et al. | 359/73 |
| 5,619,352 | 4/1997 | Koch et al. | 349/117 |
| 5,631,755 | 5/1997 | Sakaya et al. | 349/117 |
| 5,638,197 | 6/1997 | Gunning, III et al. | 349/117 |
| 5,691,791 | 11/1997 | Nakamura et al. | 349/113 |
| 5,693,253 | 12/1997 | Ohnishi et al. | 252/299.01 |
| 5,888,634 | 3/1999 | Shimizu et al. | 428/212 |
| 5,926,313 | 7/1999 | Hishinuma et al. | 359/486 |

FOREIGN PATENT DOCUMENTS

| | | |
|---|---|---|
| 0 350 383 | 1/1990 | European Pat. Off. . |
| 63-239421 | 10/1988 | Japan . |
| 3-103823 | 4/1991 | Japan . |
| 5-80323 | 4/1993 | Japan . |
| 410123322A | 5/1998 | Japan . |
| 410123323A | 5/1998 | Japan . |
| 2 272 779 | 5/1994 | United Kingdom . |
| WO 96/10773 | 4/1996 | WIPO . |
| WO 97/44703 | 11/1997 | WIPO . |

OTHER PUBLICATIONS

Applied Optics, vol. 28, No. 13 p2466–2482(1989) "Thin film retardation plate by oblique deposition".

*Primary Examiner*—William L. Sikes
*Assistant Examiner*—Tarifur R. Chowdhury
*Attorney, Agent, or Firm*—Sughrue, Mion, Zinn, Macpeak & Seas, PLLC

[57] ABSTRACT

A phase retarder film is provided wherein at least one oblique evaporation layer comprising an inorganic dielectric mainly containing TiO$_2$ is formed on at least one surface of a transparent polymer film with an intermediate layer between, the evaporation layer having positive refractive index anisotropy and a principal optic axis tilted 20 degrees to 70 degrees from a normal direction to said transparent polymer film. The phase retarder film is suitable for improving viewing angle characteristics of the TN-LCD.

12 Claims, No Drawings

PHASE RETARDER FILM CONTAINING TIO₂

FIELD OF THE INVENTION

The present invention relates to a phase retarder film which improves viewing angle characteristics of liquid crystal displays.

BACKGROUND OF THE INVENTION

The liquid crystal display (hereinafter, referred to as LCD) which is most widely used at present is a twisted nematic LCD (hereinafter, referred to as TN-LCD) of which type is normally white (hereinafter, referred to as NW) mode in which a liquid crystal cell (such that nematic liquid crystal is held between a pair of glass substrates having transparent electrodes) is sandwiched between a pair of linearly polarizing films disposed so that the absorption axes thereof are perpendicular to each other. The nematic liquid crystal has an orientation structure such that the helical axis is normal to the glass substrates and the twist angle thereof is approximately 90 degrees.

When no voltage is applied, the NW mode TN-LCD is in white state since the incident linearly polarized light exits after being rotated 90 degrees because of the optical rotatory power of the liquid crystal cell. When a voltage is applied, the NW mode TN-LCD is in black state since the liquid crystal molecules stand up with respect to the glass substrates to cause the optical rotatory power to disappear and the incident linearly polarized light exits as it is. Gray scale is performed by using the white state, the black state and intermediate states therebetween.

However, the nematic liquid crystal used for the LCD has a rod-like molecular structure and exhibits positive refractive index anisotropy where the refractive index is higher in the direction of the molecular axis than in the normal direction to the molecular axis, so that the polarization condition of light obliquely passing through the liquid crystal cell varies in a different direction from a normal direction to the liquid crystal cell because of a phase difference due to the refractive index anisotropy of the liquid crystal. For this reason, when the display on the LCD is viewed from angles other than a normal direction to the LCD, viewing angle characteristics are shown such that the contrast decreases and that gray scale inversion takes place.

Since the viewing angle characteristics are caused by the refractive index anisotropy of the liquid crystal molecules, an improvement is being examined using a phase retarder film exhibiting a refractive index anisotropy opposite to that of the liquid crystal to compensate the phase difference due to the refractive index anisotropy of the liquid crystal molecules.

However, only a phase retarder film can be obtained that has small size, or is heavy in weight, or is inferior in mass production.

In view of circumstances, the present inventors have developed a phase retarder film having large size, being light-weight and being excellent in mass productivity which comprises an oblique evaporation layer comprising an inorganic dielectric such as $Ta_2O_5$, $WO_3$ and $SiO_2$.

SUMMARY AND OBJECTS OF THE INVENTION

Furthermore, the present inventors have continued to devote intensive efforts to provide a phase retarder film which has a more excellent evaporation layer in uniformity and can be produced at higher rate at lower temperature than the above-mentioned one. As a result, the present inventors have developed a phase retarder film having large size, being light-weight and being excellent in mass productivity as well as being more excellent in uniformity and being produced at higher rate at lower temperature than the above-mentioned one.

The present invention have accomplished the foregoing and other objective by providing a phase retarder film which comprises an oblique evaporation layer comprising an inorganic dielectric mainly containing $TiO_2$.

That is, the present invention provides a phase retarder film wherein at least one oblique evaporation layer comprising an inorganic dielectric mainly containing $TiO_2$ is formed on at least one surface of a transparent polymer film with an intermediate layer between, said oblique evaporation layer having positive refractive index anisotropy and having its principal optic axis tilted 20 degrees to 70 degrees from a normal direction to said transparent polymer film.

DETAILED DESCRIPTION OF THE INVENTION

A transparent polymer film used in the present invention is not specifically limited as long as the film is excellent in transparency and is uniform. A film made from a thermoplastic polymer is preferred, because the film can be easily produced.

Examples of the thermoplastic polymer include cellulose polymers, polycarbonate polymers, polyarylate polymers, polyester polymers, acrylic polymers, polysulfone and polyether sulfone.

While polysulfone and polyether sulfone being excellent in heat resistance are advantageous for evaporation, cellulose polymers and polycarbonate polymers from which films being inexpensive and uniform are obtained are also preferably used.

When a transparent polymer film having a low in-plane retardation value is suitable for a use, cellulose polymer films and acrylic polymer films of which intrinsic birefringence is low are particularly preferred. When a transparent polymer film having an in-plane retardation value of several tens of nm is necessary, polycarbonate polymer films, polyester polymer films, polysulfone film and polyether sulfone film of which intrinsic birefringence is high are preferred. It is noted that the in-plane retardation value of transparent polymer film (hereinafter, referred to as $R_b$ value) is calculated by the following formula:

$$R_b = (nb_x \times nb_y) \times d_b$$

(wherein "$nb_x$" is an in-plane refractive index of the transparent polymer film in a direction of slow axis, "$nb_y$" is an in-plane refractive index of the transparent polymer film in a direction of fast axis and "$d_b$" is a thickness of the transparent polymer film.)

When an oblique evaporation layer comprising an inorganic dielectric is provided on a continuous film, cellulose triacetate films and polyether sulfone films are preferably used in which the film deformation, caused by the radiant heat at the time of evaporation and the stress due to the film transportation, is small.

When the transparent polymer film is formed, a solvent casting method or a precision extrusion method with which the residual stress of the film is small may be used. The solvent casting method is preferably used in view of the uniformity of the formed films. For forming a film of which the $R_b$ value is low, the solvent casting method is particularly preferred.

While the film thus obtained, particularly, the film formed by the solvent casting method, shows the very low in-plane retardation value, the refractive index ($nb_t$) in the thickness direction of the film becomes lower than the average in-plane refractive index ($nb_p$) because of the in-plane orientation of the polymer at the time of film formation. For this reason, the transparent polymer film has a retardation value in the thickness direction of the film, (the retardation value ($R'_b$ value) being calculated by the following formula:

$$R'_b=(nb_p-nb_t)\times d_b$$

wherein $d_b$ is the thickness of the film), due to the birefringence in the thickness direction of the film, so that the transparent polymer film may be used not only as a mere base film for evaporation but also as a phase retarder film which has negative refractive index anisotropy and which can be used in combination with an oblique evaporation layer comprising an inorganic dielectric layer according to the present invention having positive refractive index anisotropy and having its principal optic axis tilted from a normal direction to the film. The $R'_b$ value of the transparent polymer film is in the range of approximately 0 nm to 250 nm.

When the $R'_b$ value of the transparent polymer film is insufficient with respect to a predetermined value, the $R'_b$ value may be adjusted by forming a layer including an layered inorganic compound described in U.S. Pat. No. 5,430,566 on the transparent polymer film.

The transparent polymer film may be used as a uniaxially oriented film having the $R_b$ value. In this case, the transparent polymer film may be formed by stretching a film formed by the solvent casting method or the precision extrusion method by using a stretching method such as stretching between rolls or tentering. When the transparent polymer film is used as the uniaxially oriented film, the $R_b$ value is generally set in the range of 100 nm or lower.

It should be noted that the uniaxial orientation in the present invention includes not only complete uniaxial orientation but also a certain extent biaxial orientation having the $R_b$ value.

Although not specifically limited, the thickness of these transparent polymer films is generally set in the range of approximately 50 μm to 500 μm.

In the present invention, in order for the oblique evaporation layer comprising an inorganic dielectric mainly containing $TiO_2$ to come to have a predetermined retardation value necessary for the phase retarder film in forming the at least one oblique evaporation layer on at least one surface of the transparent polymer film, the retarder film is considerably large in thickness compared with ordinal evaporation film like an anti-reflection film formed by a multilayer evaporation of a dielectric. Therefore, an intermediate layer is provided for improving the adhesion property to prevent the evaporation layer from cracking.

Examples of the intermediate layer used in the present invention include polymer films formed of acrylic resin, urethane resin, silicon resin, cardo resin and polysilazane.

These polymer films are formed in a manner such that a polymerized material is dissolved in a solvent and applied to a transparent polymer film or that a composition including a polymerization initiator and a monomer and/or an oligomer is applied to a transparent polymer film and polymerized by ultraviolet cure or thermosetting.

The method for applying the polymerized material or the composition to the transparent polymer film is not specifically limited and known methods may be used such as comma coating method, die coating method, direct gravure coating method and bar coating method.

When the transparent polymer film is made from a cellulose polymer, a polycarbonate polymer or a polyester polymer, ultraviolet curing acrylic resins are preferably used for forming the intermediate layer. When the transparent polymer film has high heat resistance such as a polysulfone film or a polyether sulfone film, thermosetting polysilazane may also be used.

The thickness of the polymer film used as the intermediate layer is not specifically limited as long as an improvement in adhesion property can be realized, and may be set in the range of approximately 0.2 μm to 10 μm.

It is not preferable that the thickness is outside this range because when the thickness is less than approximately 0.2 μm, it tends to be difficult to obtain a uniform film by coating and when the thickness is more than approximately 10 μm, the adhesion property between the transparent polymer film and the intermediate layer tends to degrade.

In the present invention, an oblique evaporation layer comprising an inorganic dielectric mainly containing $TiO_2$ is utilized.

A preferred inorganic dielectric for a phase retarder film is the one (i) which can be formed into a thin film by evaporation, (ii) which shows positive refractive index anisotropy when oblique evaporation is performed, (iii) which has a principal optic axis tilted 20 degrees to 70 degrees from a normal direction to the resulting film, (iv) which is excellent in transparency and (v) which comprises metallic oxides which can be formed into a hard film. In addition, in view of the productivity, an inorganic dielectric is preferred which easily generates refractive index anisotropy in oblique evaporation and which shows an optical characteristics needed for a phase retarder film even if an dielectric evaporation is formed as thin as possible. Examples of the preferred inorganic dielectric having such properties include metallic oxides containing as a main components $Ta_2O_5$, $TiO_2$ and $ZrO_2$. It is noted that the amount of the main component in the metallic oxide is preferably in the range of 50% to 100%, more preferably in the range of 60% to 100%, by weight based on the metallic oxide.

Among the preferred inorganic dielectric, the metallic oxide utilized in the present invention, i.e. the metallic oxides mainly containing $TiO_2$ is the most preferable one. The metallic oxide mainly containing $TiO_2$ can be provided by using titanium oxides and/or metal titanium as evaporation materials. These materials make a flat surface thereof when melted and can stably evaporate in forming the film of dielectric by the electron beam evaporation method and, therefore, an excellent evaporation layer in uniformity is obtained easily when these materials are utilized. Moreover, the metallic oxides mainly containing $TiO_2$ can be desirably evaporated at lower temperature to form the film thereof at higher rate than metallic oxides mainly containing $Ta_2O_5$ or $ZrO_2$, without accompanying any damage due to heat to the transparent polymer film on which the evaporation layer is formed.

The angle of oblique evaporation is defined by the angle between the line connecting the evaporation points on the film with the evaporation source and a normal line to the film surface. By setting the evaporation angle in the range of approximately 50 degrees to 85 degrees, the angle between the principal optic axis of the evaporation layer comprising the dielectric layer and a normal direction to the film becomes the predetermined angle, namely approximately 20 degrees to 70 degrees. The specific evaporation angle is decided based on each combination of the transparent polymer film and the evaporation material used, because the preferable angle may differ according to the combination.

In the present invention, the in-plane retardation value of oblique evaporation layer comprising the inorganic dielectric is preferably in the range of approximately 20 nm to 200 nm. The in-plane retardation value of oblique evaporation layer (hereinafter, referred to as $R_a$ value) can be calculated in the following formula:

$$R_a = (na_x - na_y) \times d_a$$

(wherein "$na_x$" is an in-plane refractive index of the oblique evaporation layer in a direction of slow axis, "$na_y$" is an in-plane refractive index of the oblique evaporation layer in a direction of fast axis and "$d_a$" is a thickness of the oblique evaporation layer.)

The thickness of the oblique evaporation layer comprising the inorganic dielectric mainly containing $TiO_2$ is not specifically restricted as long as it is equal to or larger than a thickness where anisotropy is generated in the growth of the columnar microstructure to exhibit birefringence. It may be set at a thickness where the above-mentioned preferred $R_a$ value, i.e. the $R_a$ value of approximately 20 nm to 200 nm, can be exhibited. While the preferred thickness differs depending on the birefringence of the utilized material and the tilted angle of the principal optic axis from a normal direction to the film, it is generally in the range of approximately 0.2 μm to 5 μm, preferably in the range of approximately 0.4 μm to 1 μm.

In the present invention, the retarder film comprises at least one dielectric layer which mainly contains $TiO_2$ and is formed by oblique evaporation. Moreover, depending on the viewing angle characteristics to be improved in the LCD for which the retarder film of the present invention is applied, the retarder film of the present invention may comprise a dielectric layer composed of a plurality of layers wherein each of them has an each different optic-axis tilted angle which is differently tilted from a normal direction to the film, or a dielectric layer composed of a plurality of layers wherein each of them has a different azimuth of the tilted direction although each has the same tilted angle, or may comprise a combination of those dielectric layers.

If necessary, the dielectric layer of the invention may be composed of a plurality of layers made of some inorganic dielectric other than the dielectric layer mainly containing $TiO_2$ and the $TiO_2$-containing dielectric layer.

The method for the oblique evaporation used in the present invention may be a known method such as an electron beam evaporation method or an ion plating method. In view of mass productivity, the electron beam evaporation method is preferably used.

Oblique evaporation onto a continuous film may be performed by providing, in an evaporation apparatus capable of continuously evaporating films, slits or shielding plates between the evaporation source and the film so that only the inorganic dielectric that comes flying from a predetermined evaporation angle is selectively evaporated and the inorganic dielectric which comes flying from unnecessary evaporation angles is cut off. At this time, in order for the inorganic dielectric to be efficiently evaporated onto the film, the evaporation source, the shielding plates and the film are disposed so that the film passes over the evaporation source.

Since a problem such that temperature increase of a polymer film induces deformation of the film can arise in the evaporation, it is preferable to provide radiant heat shielding plates so that excessive radiant heat is not applied to the film.

While it is a problem that the film is deformed, since characteristics of the formed dielectric layer vary depending on the film temperature at the time of oblique evaporation, it is preferable for the film guide roller or can roller to be capable of being temperature-controlled so that the film temperature at the evaporated portion may be controlled. The temperature control range may be less than the glass transition temperature of the polymer, preferably less than the thermal deformation temperature of the polymer.

It is more preferable that the guide roller or can roller can be cooled to 0° C. or lower.

In the present invention, titanium oxides and metal titanium can be utilized as an evaporation material for providing the inorganic dielectric mainly containing $TiO_2$. Examples of the titanium oxides include $TiO_2$ and $Ti_3O_5$. In view of easy evaporation, evaporation rate and low radiant heat, $Ti_3O_5$ is preferred. At the time of evaporation, a mixture ratio of oxygen to air in the evaporation layer can be adjusted to the suitable one by introducing oxygen gas into the evaporation apparatus, if necessary, so that transparency of the evaporation layer may be improved. When metal titanium is utilized, the reactive evaporation is conducted under introduction of oxygen gas so that the titanium reacts with oxygen to be titanium oxides.

When oxygen gas is introduced into the evaporation apparatus, in any case, the amount of oxygen gas introduced is properly decided depending on the volume and the evacuation property of the evaporation apparatus. When the amount is too small, the effect of the oxygen introduction is insufficient. When the amount is too much, the air pressure tends to increase and the evaporation rate tends to decrease. In general, the amount of oxygen gas is adjusted so that the air pressure becomes to be less than $10^{-3}$ Torr in the evaporation apparatus.

Before obliquely evaporating the inorganic dielectric, any surface treatment can be applied on the surface, onto which the evaporation layer is formed, of the transparent polymer film or of the intermediate layer on the transparent polymer film. By the surface treatment, the adhesion increases between the evaporation layer and the transparent polymer film or between the evaporation layer and the intermediate layer formed on the transparent polymer film. The method of the surface treatment is not restricted. Examples of the method include heat treatment in vacuum, corona treatment, ion bombard treatment, plasma treatment, ultraviolet irradiation and acid/alkaline treatment. The method of the surface treatment and the extent of the treatment can be properly decided depending on the kinds of the transparent polymer film, the intermediate layer and the evaporation material as well as depending on the mechanical strength, the durability and the optical properties of the final product, i.e. the phase retarder film.

The phase retarder film of the present invention can be utilized for improving the viewing angle characteristics of the TN-LCD, and also utilized for improving the viewing angle characteristics of a super twisted nematic (STN) type LCD. When the phase retarder film is utilized for each application, the tilted angle of the principal optic axis of the inorganic dielectric layer from a normal direction to the film, the retardation value of the inorganic dielectric layer and the retardation value of the transparent polymer film are properly set at different values accordingly.

The phase retarder film of the present invention is a phase retarder film having its principal optic axis tilted from a normal direction to the film and having positive refractive index anisotropy, and being suitable for improving viewing angle characteristics of the TN-LCD. By employing the structure of the present invention, a light-weight and large-size film may be easily and inexpensively obtained. In addition, the film has an excellent evaporation layer in uniformity, and can be produced at high ratio at low temperature in evaporation.

The entire disclosure of the Japanese Patent Application No. 10-9543 filed on Jan. 21, 1998, indicating specification, claims and summary, are incorporated herein by reference in their entirety.

EXAMPLES

The present invention is described in more detail by following Examples, which should not be construed as a limitation upon the scope of the present invention.

The measurement of the $R_a$ value and the $R_b$ value in Examples was carried out by an ordinary method (Sénarmont method) by using a polarizing microscope with monochromatic light of 546 nm.

The tilted angle of the principal optic axis from a normal direction to the film was obtained by measurements on the basis of ordinary methods known to those people skilled in the art assuming that the refractive index structure was uniaxial.

Example 1

A cellulose triacetate film having the $R_b$ value of about 11 nm (product name: Fuji TAC SH-80, made by Fuji Photo Film Co., Ltd.) was coated with an ultraviolet-curing acrylic resin by a comma coater. After ultraviolet irradiation to cure the resin, a transparent polymer film was obtained on which an acrylic resin film with a thickness of approximately 5 μm was formed as the intermediate layer.

The transparent polymer film having the intermediate layer was set in a holder of a evaporation apparatus, and evacuation was performed until the degree of vacuum reached $2 \times 10^{-5}$ Torr. Then, one layer of an oblique evaporation layer mainly containing $TiO_2$ with a thickness of 7300 Å was formed at an average evaporation rate of 121 Å/sec using $Ti_3O_5$ (product name: OS-50, made by Optrone Co., Ltd.) as the evaporation material by the electron beam evaporation method at an evaporation center angle of 75 degrees under the following condition to obtain a phase retarder film.

The condition:

Distance between the evaporation point and the transparent polymer film: 300 mm, Electronic gun output: 2.4 kW At the formation of oblique evaporation layer, the evaporation was conducted twice at the same tilted angle in order for the temperature of the transparent polymer film not to increase. The evaporation material was completely melt in the crucible, and made a flat surface of the melting material.

The appearance of the phase retarder film was visually evaluated and it was found that there was no deformation of the polymer film caused by the radiant heat at the time of evaporation and that there was no peeling such as cracks on the evaporation layer.

The phase retarder film had the in-plane retardation value of 71 nm and the principal optic axis was tilted about 57 degrees from a normal direction to the film.

What is claimed is:

1. A phase retarder film wherein at least one oblique evaporation layer comprising an inorganic dielectric mainly containing $TiO_2$ is formed on at least one surface of a transparent polymer film with an intermediate layer between, said oblique evaporation layer having positive refractive index anisotropy and having its principal optic axis tilted 20 degrees to 70 degrees from a normal direction to said transparent polymer film.

2. A phase retarder film according to claim 1, wherein said transparent polymer film is a thermoplastic polymer film.

3. A phase retarder film according to claim 2, wherein said thermoplastic polymer is a cellulose polymer, a polycarbonate polymer, a polyarylate polymer, a polyester polymer, an acrylic polymer, polysulfone or polyether sulfone.

4. A phase retarder film according to claim 1, wherein said transparent polymer film is a film formed of a thermoplastic polymer by a solvent casting method.

5. A phase retarder film according to claim 4, wherein said thermoplastic polymer is a cellulose polymer, a polycarbonate polymer, a polyarylate polymer, a polyester polymer, an acrylic polymer, polysulfone or polyether sulfone.

6. A phase retarder film according to claim 1, wherein an in-plane retardation value of said transparent polymer film is less than 100 nm.

7. A phase retarder film according to claim 1, wherein said intermediate layer is a polymer film formed of an acrylic resin, an urethane resin, a silicon resin, polysilazane or a cardo resin.

8. A phase retarder film according to claim 1, wherein said intermediate layer is 0.2 μm to 10 μm in thickness.

9. A phase retarder film according to claim 1, wherein said oblique evaporation layer is formed by using titanium oxide (s) or metal titanium as an evaporation material.

10. A phase retarder film according to claim 9, wherein said oblique evaporation layer is formed by using $Ti_3O_5$ as an evaporation material.

11. A phase retarder film according to claim 1, wherein said oblique evaporation layer is formed under the introduction of oxygen gas.

12. A phase retarder film according to claim 1, wherein said oblique evaporation layer is 0.2 μm to 5 μm in thickness.

* * * * *